(12) United States Patent
Chien et al.

(10) Patent No.: US 10,162,251 B1
(45) Date of Patent: Dec. 25, 2018

(54) LIGHT INTEGRATING SYSTEM AND PROJECTION APPARATUS THEREOF

(71) Applicant: QISDA CORPORATION, Taoyuan (TW)

(72) Inventors: Chih-Shiung Chien, Taoyuan (TW); Ming-Kuen Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/953,496

(22) Filed: Apr. 15, 2018

(30) Foreign Application Priority Data

Mar. 23, 2018 (CN) .......................... 2018 1 0255255

(51) Int. Cl.
*G03B 21/20* (2006.01)

(52) U.S. Cl.
CPC ....... *G03B 21/2013* (2013.01); *G03B 21/208* (2013.01); *G03B 21/2026* (2013.01); *G03B 21/2066* (2013.01)

(58) Field of Classification Search
CPC ............... G03B 21/204; G03B 21/208; G03B 21/2013; G03B 21/2033; G03B 21/2053; H04N 9/315; H04N 9/3114; H04N 9/3158; H04N 9/3155; H04N 9/3166; G02B 27/10; G02B 27/145; G02B 27/283; G02B 27/0972; G02B 27/0994; G02B 27/1026; G02B 27/1033
See application file for complete search history.

(56) References Cited

U.S. PATENT DOCUMENTS

2005/0018149 A1\* 1/2005 Takeda ...................... G02B 6/00
353/99
2011/0261271 A1\* 10/2011 Yamagishi ........... H04N 9/3152
348/744

\* cited by examiner

*Primary Examiner* — Sultan Chowdhury

(57) ABSTRACT

A light integrating system includes an integrator rod, a triangular prism, and first and second light sources misaligned with each other. The integrator rod has a light-integrating axis, first and second light-entrance surfaces, a first reflection inclined surface and a first light-exit surface. The triangular prism adjacent to the second light-entrance surface has a third light-entrance surface, a second light-exit surface, and a second reflection inclined surface. Light of the first light source is incident into the integrator rod through the first light-entrance surface and is reflected by the first reflection inclined surface to emit out of the first light-exit surface along the light-integrating axis. Light of the second light source is incident into the triangular prism through the third light-entrance surface and is reflected by the second reflection inclined surface to emit out of the first light-exit surface through the second light-exit surface and the second light-entrance surface sequentially.

20 Claims, 2 Drawing Sheets

LIGHT INTEGRATING SYSTEM AND PROJECTION APPARATUS THEREOF

BACKGROUND OF THE INVENTION

1. Field of the Invention

The present invention relates to a light integrating system and a projection apparatus thereof, and more specifically, to a light integrating system having a triangular prism disposed adjacent to an integrator rod and two light sources aligned with the integrator rod and the triangular prism respectively and a projection apparatus thereof.

2. Description of the Prior Art

In recent years, a projection apparatus (e.g. liquid crystal projector, DLP (Digital Light Processing) projector, etc.) are becoming widespread. In general, two light sources are disposed in the projection apparatus to provide light needed for color image projection, and an integrator rod is disposed between and aligned with the two light sources for converging light emitted by the two light sources to ensure uniformity of images projected by the projection apparatus. For example, US Publication No. 20110222025 discloses that two light sources are disposed at two sides of an integrator rod to respectively emit light into the integrator rod for converging light. However, the aforesaid design causes damage of the two light sources easily since the two light sources may emit light to each other, so as to lead to reduction of life of the two light sources.

SUMMARY OF THE INVENTION

The present invention provides a light integrating system including an integrator rod, a triangular prism, a first light source, and a second light source. The integrator rod has a light-integrating axis, a first light-entrance surface, a second light-entrance surface, a first reflection inclined surface, and a first light-exit surface. The first light-entrance surface and the first reflection inclined surface are opposite to each other and connected to two sides of the second light-entrance surface respectively. The second light-entrance surface and the first light-exit surface are opposite to each other and perpendicular to the light-integrating axis. The triangular prism is adjacent to the second light-entrance surface. The triangular prism has a third light-entrance surface, a second light-exit surface, and a second reflection inclined surface. The second light-exit surface faces the second light-entrance surface and is perpendicular to the light-integrating axis. The second reflection inclined surface is connected to the third light-entrance surface and the second light-exit surface respectively. The first light source faces the first light-entrance surface. Light of the first light source is incident into the integrator rod through the first light-entrance surface and is reflected by the first reflection inclined surface to emit out of the first light-exit surface along the light-integrating axis. The second light source faces the third light-entrance surface to be misaligned with the first light source. Light of the second light source is incident into the triangular prism through the third light-entrance surface and is reflected by the second reflection inclined surface to emit out of the first light-exit surface through the second light-exit surface and the second light-entrance surface sequentially along the light-integrating axis.

The present invention further provides a projector apparatus including a light integrating system, a light splitting system, and a projector lens system. The light integrating system includes an integrator rod, a triangular prism, a first light source, and a second light source. The integrator rod has a light-integrating axis, a first light-entrance surface, a second light-entrance surface, a first reflection inclined surface, and a first light-exit surface. The first light-entrance surface and the first reflection inclined surface are opposite to each other and connected to two sides of the second light-entrance surface respectively. The second light-entrance surface and the first light-exit surface are opposite to each other and perpendicular to the light-integrating axis. The triangular prism is adjacent to the second light-entrance surface and has a third light-entrance surface, a second light-exit surface, and a second reflection inclined surface. The second light-exit surface faces the second light-entrance surface and is perpendicular to the light-integrating axis. The second reflection inclined surface is connected to the third light-entrance surface and the second light-exit surface respectively. The first light source faces the first light-entrance surface. Light of the first light source is incident into the integrator rod through the first light-entrance surface and is reflected by the first reflection inclined surface to emit out of the first light-exit surface along the light-integrating axis. The second light source faces the third light-entrance surface to be misaligned with the first light source. Light of the second light source is incident into the triangular prism through the third light-entrance surface and is reflected by the second reflection inclined surface to emit out of the first light-exit surface through the second light-exit surface and the second light-entrance surface sequentially along the light-integrating axis for forming a light beam cooperatively with the light of the first light source. The light splitting system is adjacent to the first light-exit surface for receiving the light beam and then splitting the light beam into image forming lights. The projector lens system receives the image forming lights for projecting a color image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
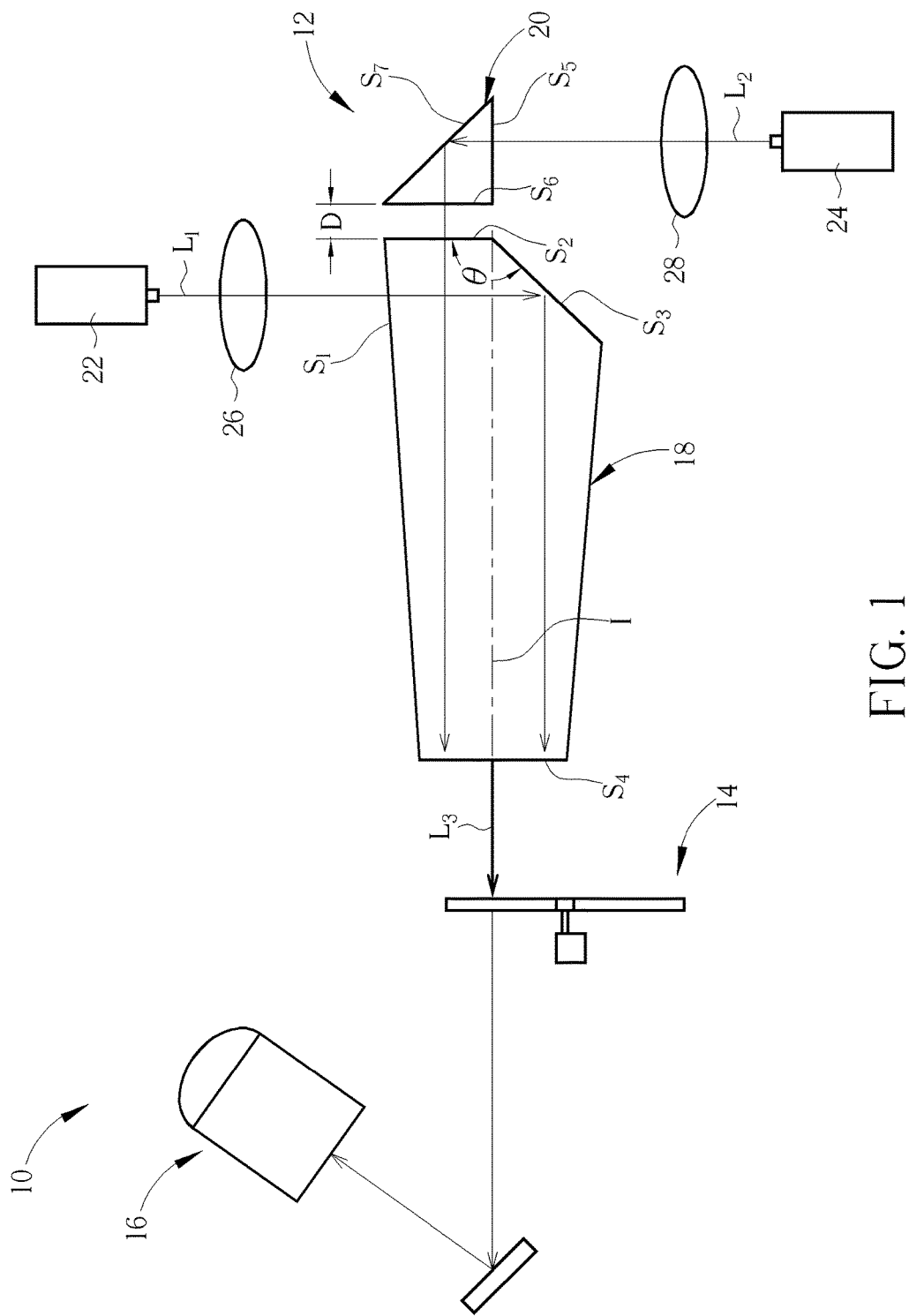
FIG. 1 is a diagram of a projection apparatus according to an embodiment of the present invention.

Please refer to FIG. 1, which is a diagram of a projection apparatus 10 according to an embodiment of the present invention. The projection apparatus 10 could preferably be a DLP projector, but not limited thereto, meaning that the present invention could be applied to other type of optical projector in another embodiment, such as a liquid crystal projector. As shown in FIG. 1, the projection apparatus 10 includes a light integrating system 12, a light splitting system 14 and a projector lens system 16. The light integrating system 12 includes an integrator rod 18, a triangular prism 20, a first light source 22, and a second light source 24. The integrator rod 18 has a light-integrating axis I, a first light-entrance surface $S_1$, a second light-entrance surface $S_2$, a first reflection inclined surface $S_3$, and a first light-exit surface $S_4$. The triangular prism 20 is adjacent to the second light-entrance surface $S_2$ and has a third light-entrance surface $S_5$, a second light-exit surface $S_6$, and a second reflection inclined surface $S_7$.

To be more specific, the first light-entrance surface $S_1$ and the first reflection inclined surface $S_3$ are opposite to each other and connected to two sides of the second light-entrance surface $S_2$ respectively, and the second light-entrance surface $S_2$ and the first light-exit surface $S_4$ are opposite to each other and perpendicular to the light-integrating axis I. Furthermore, the second light-exit surface $S_6$ faces the second light-entrance surface $S_2$ and is perpendicular to the light-integrating axis I, and the second reflection inclined surface $S_7$ is connected to the third light-entrance surface $S_5$ and the second light-exit surface $S_6$ respectively.

In practical application, for improving efficiency of the integrator rod 18 in use of light, the second light-entrance surface $S_2$ could preferably forms a 135-degree angle θ with the first reflection inclined surface $S_3$, and an area of the second light-exit surface $S_6$ could preferably be equal to an area of the second light-entrance surface $S_2$. In addition, the third light-entrance surface $S_5$ could preferably be perpendicular to the second light-exit surface $S_6$. Further, in this embodiment, the third light-entrance surface $S_5$, the second light-exit surface $S_6$, and the second reflection inclined surface $S_7$ could preferably form an isosceles triangle shape. That is to say, an area of the third light-entrance surface $S_5$ could further be equal to the area of the second light-exit surface $S_6$, and the second reflection inclined surface $S_7$ could form a 45-degree angle with the third light-entrance surface $S_5$ and the second light-exit surface $S_6$ respectively.

The first light source 22 and the second light source 24 could be a mercury lamp, but not limited thereto, meaning that the present invention could adopt other type of light source suitable for a conventional optical projector in another embodiment, such as laser diode, LED (Light Emitting Diode), arrays of LEDs, or other solid state sources. The first light source 22 faces the first light-entrance surface $S_1$, and the second light source 24 faces the third light-entrance surface $S_5$ to be misaligned with the first light source 22.

Accordingly, light $L_1$ of the first light source 22 can be incident into the integrator rod 18 through the first light-entrance surface $S_1$ and can be reflected by the first reflection inclined surface $S_3$, and light $L_2$ of the second light source 24 can be incident into the triangular prism 20 through the third light-entrance surface $S_5$ and can be reflected by the second reflection inclined surface $S_7$.

Via reflection of the first reflection inclined surface $S_3$ and the second reflection inclined surface $S_7$, the light $L_1$ of the first light source 22 can be emitted out of the first light-exit surface $S_4$ along the light-integrating axis I, and the light $L_2$ of the second light source 24 can be emitted out of the first light-exit surface $S_4$ through the second light-exit surface $S_6$ and the second light-entrance surface $S_2$ sequentially along the light-integrating axis I. In such a manner, the light $L_1$ of the first light source 22 and the light $L_2$ of the second light source 24 can be converged in the integrator rod 18 for cooperatively forming a light beam $L_3$. To be noted, for further improving efficiency of the light integrating system 12 in use of light, the light integrating system 12 could further include a first condensing lens 26 and a second condensing lens 28. The first condensing lens 26 is disposed between the first light source 22 and the first light-entrance surface $S_1$, and the second condensing lens 28 is disposed between the second light source 24 and the third light-entrance surface $S_5$. As such, the light $L_1$ of the first light source 22 and the light $L_2$ of the second light source 24 can be surely incident into the integrator rod 18 and the triangular prism 20 for efficiently preventing light leakage.

Subsequently, as shown in FIG. 1, the light splitting system 14 adjacent to the first light-exit surface $S_4$ receives the light beam $L_3$ and then splits the light beam $L_3$ into image forming lights. Finally, the projector lens system 16 receives the image forming lights for projecting a corresponding color image. As for the detailed description for the related components of the light splitting system 14 (could include a color wheel, a reflection lens, etc.) and the projector lens system 16 (could include a digital micromirror device, a projector lens module, etc.), it is commonly seen in the prior art and omitted herein for simplicity.

Figure 2:
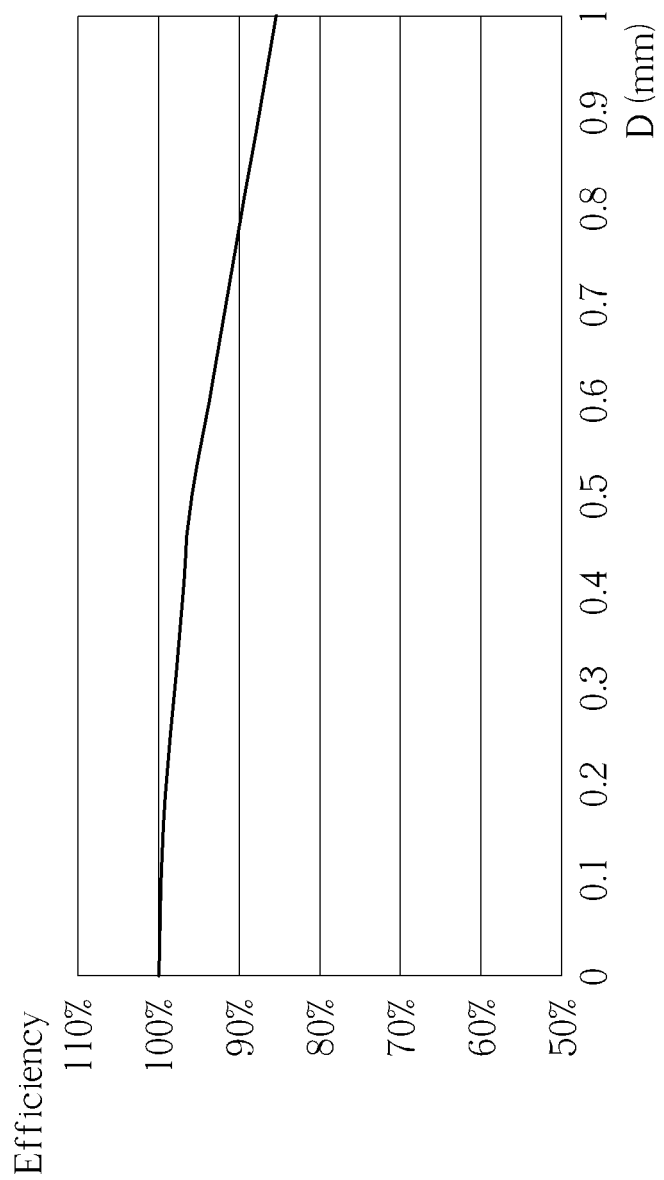
FIG. 2 is an efficiency-gap diagram of the projector apparatus in FIG. 1.

Moreover, in this embodiment, a gap D could be formed between the second light-exit surface $S_6$ and the second light-entrance surface $S_2$. According to the practical experimental data, the relationship between the gap D and the efficiency of the light integrating system 12 in use of the light $L_2$ of the second light source 24 is as shown in FIG. 2. In practical application, the gap D could preferably be less than 0.8 mm, but not limited thereto.

It should be mentioned that the structural configuration of the integrator rod 18 and the triangular prism 20 is not limited to the aforesaid embodiment. For example, in another embodiment, the triangular prism 20 could be rotatably disposed adjacent to the second light-entrance surface $S_2$. In such a manner, if it is needed to modify the mounting position of the second light source 24 for meeting the practical manufacturing needs of the projector apparatus 10, a manufacturer just needs to rotate the triangular prism 20 to make the third light-entrance surface $S_5$ aligned with the second light source 24 for receiving the light $L_2$ of the second light source 24. Accordingly, the present invention can improve flexibility of the projector apparatus 10 in disposing the second light source 24. Moreover, in another embodiment, the triangular prism 20 could be integrally formed with or structurally attached to the integrator rod 18, so as to further improve the efficiency of the light integrating system 12 in use of the light $L_2$ of the second light source 24 since the gap D is equal to 0. As for which design is adopted, it depends on the practical application of the projector apparatus 10.

In summary, via the simple two-piece integrator design in which the triangular prism is disposed adjacent to the integrator rod and the two light sources are aligned with the integrator rod and the triangular prism respectively to be misaligned with each other, the light integrating system provided by the present invention can receive light of the two light sources for subsequent integration of light in the integrator rod. In such a manner, the prevent invention not only simplifies the structural design of the integrator rod, but also allows 360-degree installation of the projector apparatus since the two light sources are disposed at two opposite sides of the integrator rod. Moreover, the present invention can solve the prior art problem that the two light sources aligned with each other may be damaged easily, so as to extend life of the light sources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light integrating system comprising:
   an integrator rod having a light-integrating axis, a first light-entrance surface, a second light-entrance surface, a first reflection inclined surface, and a first light-exit surface, the first light-entrance surface and the first reflection inclined surface being opposite to each other and connected to two sides of the second light-entrance surface respectively, the second light-entrance surface and the first light-exit surface being opposite to each other and perpendicular to the light-integrating axis;

a triangular prism adjacent to the second light-entrance surface, the triangular prism having a third light-entrance surface, a second light-exit surface, and a second reflection inclined surface, the second light-exit surface facing the second light-entrance surface and being perpendicular to the light-integrating axis, the second reflection inclined surface being connected to the third light-entrance surface and the second light-exit surface respectively;

a first light source facing the first light-entrance surface, light of the first light source being incident into the integrator rod through the first light-entrance surface and being reflected by the first reflection inclined surface to emit out of the first light-exit surface along the light-integrating axis; and a second light source facing the third light-entrance surface to be misaligned with the first light source, light of the second light source being incident into the triangular prism through the third light-entrance surface and being reflected by the second reflection inclined surface to emit out of the first light-exit surface through the second light-exit surface and the second light-entrance surface sequentially along the light-integrating axis.

2. The light integrating system of claim 1, wherein the second light-entrance surface forms a 135-degree angle with the first reflection inclined surface.

3. The light integrating system of claim 1, wherein an area of the second light-exit surface is equal to an area of the second light-entrance surface.

4. The light integrating system of claim 3, wherein the third light-entrance surface is perpendicular to the second light-exit surface.

5. The light integrating system of claim 4, wherein an area of the third light-entrance surface is equal to the area of the second light-exit surface, and the second reflection inclined surface forms a 45-degree angle with the third light-entrance surface and the second light-exit surface respectively.

6. The light integrating system of claim 1, wherein a gap is formed between the second light-exit surface and the second light-entrance surface.

7. The light integrating system of claim 1, wherein the triangular prism is rotatably disposed adjacent to the second light-entrance surface.

8. The light integrating system of claim 1, wherein the triangular prism is integrally formed with the integrator rod.

9. The light integrating system of claim 1, wherein the first light source and the second light source are a mercury lamp.

10. The light integrating system of claim 1 further comprising:
a first condensing lens disposed between the first light source and the first light-entrance surface; and
a second condensing lens disposed between the second light source and the third light-entrance surface.

11. A projection apparatus comprising:
a light integrating system comprising:
an integrator rod having a light-integrating axis, a first light-entrance surface, a second light-entrance surface, a first reflection inclined surface, and a first light-exit surface, the first light-entrance surface and the first reflection inclined surface being opposite to each other and connected to two sides of the second light-entrance surface respectively, the second light-entrance surface and the first light-exit surface being opposite to each other and perpendicular to the light-integrating axis;

a triangular prism adjacent to the second light-entrance surface, the triangular prism having a third light-entrance surface, a second light-exit surface, and a second reflection inclined surface, the second light-exit surface facing the second light-entrance surface and being perpendicular to the light-integrating axis, the second reflection inclined surface being connected to the third light-entrance surface and the second light-exit surface respectively;

a first light source facing the first light-entrance surface, light of the first light source being incident into the integrator rod through the first light-entrance surface and being reflected by the first reflection inclined surface to emit out of the first light-exit surface along the light-integrating axis; and a second light source facing the third light-entrance surface to be misaligned with the first light source, light of the second light source being incident into the triangular prism through the third light-entrance surface and being reflected by the second reflection inclined surface to emit out of the first light-exit surface through the second light-exit surface and the second light-entrance surface sequentially along the light-integrating axis for forming a light beam cooperatively with the light of the first light source;

a light splitting system adjacent to the first light-exit surface for receiving the light beam and then splitting the light beam into image forming lights; and a projector lens system receiving the image forming lights for projecting a color image.

12. The projection apparatus of claim 11, wherein the second light-entrance surface forms a 135-degree angle with the first reflection inclined surface.

13. The projection apparatus of claim 11, wherein an area of the second light-exit surface is equal to an area of the second light-entrance surface.

14. The projection apparatus of claim 13, wherein the third light-entrance surface is perpendicular to the second light-exit surface.

15. The projection apparatus of claim 14, wherein an area of the third light-entrance surface is equal to the area of the second light-exit surface, and the second reflection inclined surface forms a 45-degree angle with the third light-entrance surface and the second light-exit surface respectively.

16. The projection apparatus of claim 11, wherein a gap is formed between the second light-exit surface and the second light-entrance surface.

17. The projection apparatus of claim 11, wherein the triangular prism is rotatably disposed adjacent to the second light-entrance surface.

18. The projection apparatus of claim 11, wherein the triangular prism is integrally formed with the integrator rod.

19. The projection apparatus of claim 11, wherein the first light source and the second light source are a mercury lamp.

20. The projection apparatus of claim 11, wherein the light integrating system further comprises:
- a first condensing lens disposed between the first light source and the first light-entrance surface; and
- a second condensing lens disposed between the second light source and the third light-entrance surface.

* * * * *